(12) United States Patent
Bolante

(10) Patent No.: US 7,633,011 B2
(45) Date of Patent: Dec. 15, 2009

(54) EXPANSION COUPLING WITH GROUND FOR AN ELECTRICAL METAL CONDUIT

(75) Inventor: Jay J. Bolante, Chicago, IL (US)

(73) Assignee: EGS Electrical Group LLC, Rosemont, IL (US)

(*) Notice: Subject to any disclaimer, the term of this patent is extended or adjusted under 35 U.S.C. 154(b) by 302 days.

(21) Appl. No.: 11/559,511

(22) Filed: Nov. 14, 2006

(65) Prior Publication Data

US 2008/0110660 A1    May 15, 2008

(51) Int. Cl.
*H02G 15/02* (2006.01)
(52) U.S. Cl. .................................................. 174/84 R
(58) Field of Classification Search ................. 174/650, 174/652, 653, 654
See application file for complete search history.

(56) References Cited

U.S. PATENT DOCUMENTS

| | | | | |
|---|---|---|---|---|
| 1,327,106 A | * | 1/1920 | Leahy | 285/341 |
| 2,233,214 A | * | 2/1941 | Boyd | 277/622 |
| 2,255,673 A | * | 9/1941 | McDermett | 285/382.7 |
| 2,479,483 A | * | 8/1949 | Ekleberry | 439/191 |
| 4,515,991 A | * | 5/1985 | Hutchison | 174/654 |
| 6,268,565 B1 | * | 7/2001 | Daoud | 174/657 |
| 6,851,728 B2 | * | 2/2005 | Minami | 285/339 |
| 6,988,746 B2 | * | 1/2006 | Olson | 285/151.1 |

FOREIGN PATENT DOCUMENTS

JP          53-10097          1/1978

OTHER PUBLICATIONS

Thomas & Betts Prior Art Expansion Fitting, Figures 1-8, Mar. 1, 2003.

* cited by examiner

*Primary Examiner*—William H Mayo, III
(74) *Attorney, Agent, or Firm*—MBHB LLP

(57) ABSTRACT

An electrical expansion coupling comprising a housing having a first end and a second end, with a first end cap secured to the first end with a first sealing gland positioned therein, and a second end cap secured to the second end with a second sealing gland positioned therein. The expansion coupling includes an axial sliding ground plate adapted to receive an electrical conduit positioned within the first end of the housing, and a stationary ground plate adapted to receive an electrical conduit positioned within the second end of the housing. The expansion coupling further includes a grounding member electrically connecting the axial sliding ground plate and the stationary ground plate, and an anti-rotation mechanism adapted for preventing relative rotation of the sliding ground plate and the stationary ground plate when a conduit is threaded into the sliding ground plate or the stationary ground plate.

16 Claims, 4 Drawing Sheets

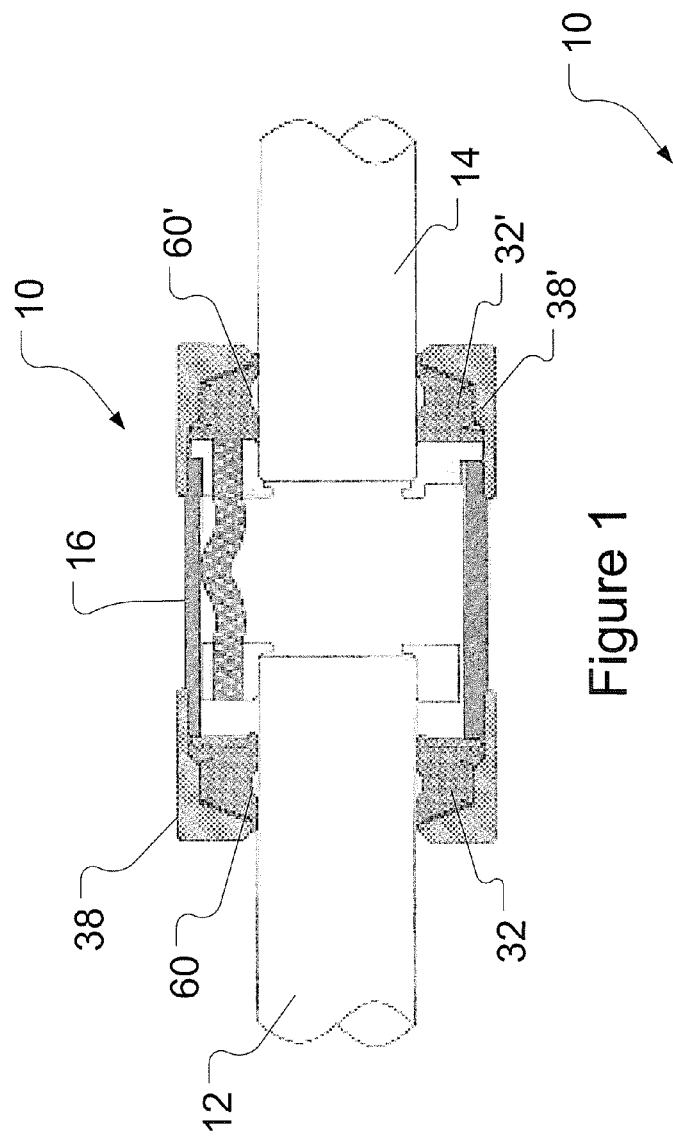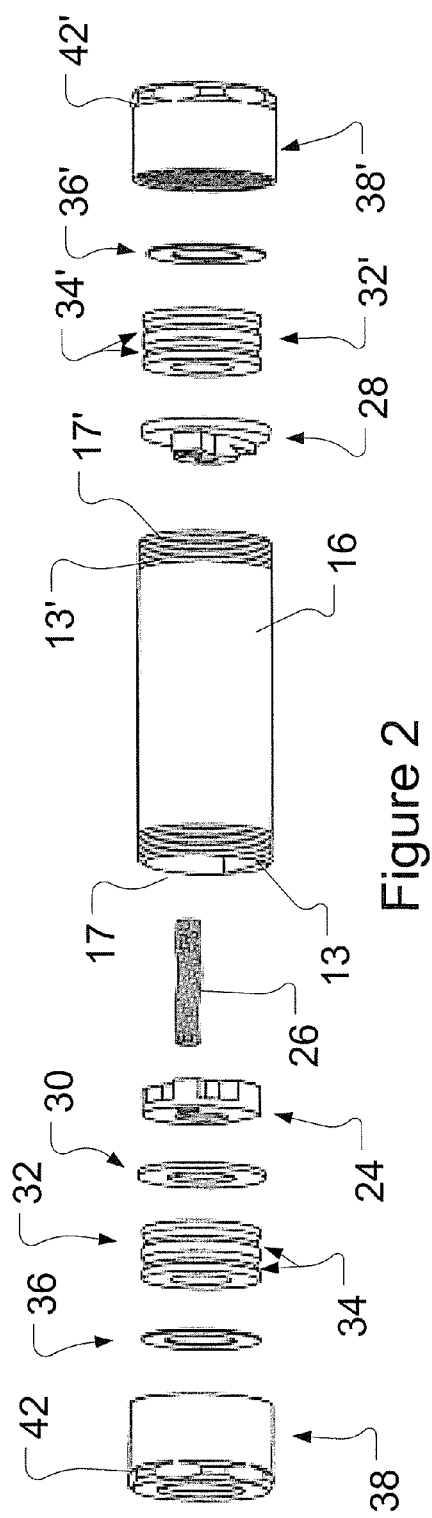

EXPANSION COUPLING WITH GROUND FOR AN ELECTRICAL METAL CONDUIT

BACKGROUND

1. Field of the Application

This application relates generally to expansion couplings for coupling electrical conduits. More particularly, the application relates to an expansion coupling internally maintaining an electrical ground across the electrical conduits.

2. Description of the Related Art

Electrical conduit is often used to enclose electrical wiring. These conduits may be metallic, and in certain instances are required to be grounded. Conduits enclosing such electrical wiring may be interconnected with electrical couplings. Some of these couplings allow for thermal expansion of the electrical conduits, permitting relative longitudinal movement between the conduits in response to temperature changes. These couplings must not only allow for thermal expansion of the conduits, but also must maintain ground continuity across the conduits during such expansion and longitudinal movement.

When applicable, it is well known to use expansion couplings to connect conduits. Some expansion couplings use an external bonding jumper to provide ground continuity. However, external bonding jumpers may become loose and are susceptible to tampering and theft. Accordingly, some expansion couplings have been designed with internal grounding mechanisms. Examples of expansion couplings with internal grounding can be found in U.S. Pat. Nos. 3,783,178 and 4,250,350. One problem associated with expansion couplings with internal grounding mechanisms is that electrical inspectors cannot always tell if the expansion coupling is properly grounded, and oftentimes redundant external bonding jumpers are installed to allow the expansion coupling to pass inspection. Thus, there is a need to design an expansion coupling that can be readily disassembled in the field to allow electrical inspectors to verify proper grounding is in place.

In addition, expansion couplings that allow for thermal expansion typically must allow for relative longitudinal movement of a conduit end to move within the expansion coupling housing. As a result, a seal may be used to prevent moisture and contaminants from entering the expansion coupling. Thus, there is a need to provide a seal to allow relative longitudinal movement of a conduit end within the expansion coupling that is effective at preventing moisture and contaminants from entering the expansion coupling.

These as well as other aspects and advantages will become apparent to those of ordinary skill in the art by reading the following detailed description, with reference where appropriate to the accompanying drawings. Further, it should be understood that the embodiments described in this summary and elsewhere are intended to illustrate the invention by way of example only.

SUMMARY

The present application provides an electrical expansion coupling comprising a housing having a first end and a second end, with a first end cap secured to the first end with a first sealing gland positioned therein, and a second end cap secured to the second end with a second sealing gland positioned therein, with an axial sliding ground plate adapted to receive an electrical conduit positioned within the first end of the housing, and a stationary ground plate adapted to receive an electrical conduit positioned within the second end of the housing, a grounding member electrically connecting the axial sliding ground plate and the stationary ground plate, and an anti-rotation mechanism adapted for preventing relative rotation of the sliding ground plate and the stationary ground plate when a conduit is threaded into the sliding ground plate or the stationary ground plate. The expansion coupling may also include a sealing gland having outer circumferential troughs on its outer diameter, such that when the sealing gland is compressed by the end cap, an inner circumferential trough is formed on the inner diameter of the sealing gland that serves to trap lubricant within the inner circumferential trough to provide for improved lubrication. Additionally, an expansion coupling providing for easy field inspection of grounding components is also provided.

BRIEF DESCRIPTION OF THE DRAWINGS

Exemplary embodiments of the invention are described herein with reference to the drawings, in which:

FIG. 1 is a cutaway view of an expansion coupling of the present invention, with the end caps tightened in place;

FIG. 2 is an expanded view of the expansion coupling shown in FIG. 1;

DETAILED DESCRIPTION

Figure 3:
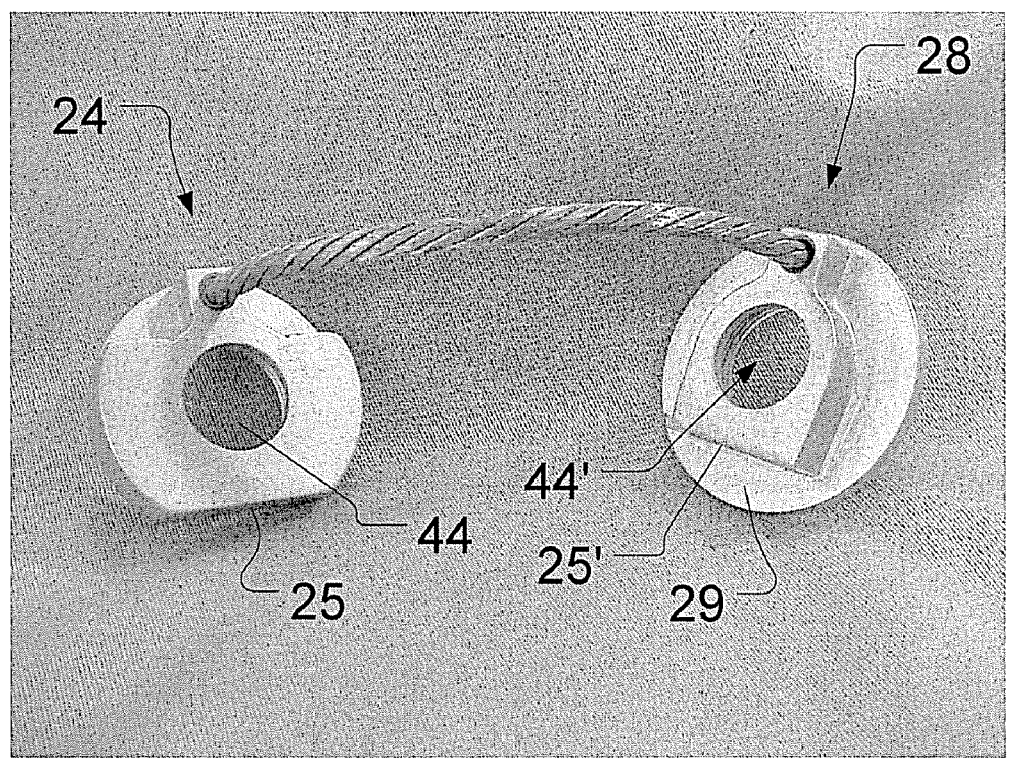
FIG. 3 is a perspective view of the ground components of FIG. 1.

Referring to FIGS. 1 and 2, an expansion coupling 10 is provided for coupling together two sections of conduit 12 and 14. The expansion coupling 10 may include a housing 16 that may be generally cylindrical. The housing includes a first end 17 and a second end 17'. The housing 16 may include a first threaded portion 13 at the first end 17, and a second threaded portion 13' at the second end 17'. The threaded portions may be either internally or externally threaded. In this embodiment, the threaded portions are externally threaded to allow for the attachment of end caps 38 and 38' that are in turn internally threaded.

Although not shown, rather than having end caps 38 and 38' attached directly to housing 16, internal or external threaded couplers could be used to indirectly attach the end caps to the housing 16. Alternatively, a number of other fastening means may be used to secure the end caps 38, 38' to the housing 16.

The expansion coupling 10 may further include ground components comprising a sliding ground plate 24, a stationary ground plate 28, and a ground cable 26 extending therebetween. The ground cable 26 connects the sliding ground plate 24 to the stationary ground plate 28. The ground cable may be a flexible cable as shown or even a rigid rod that slides through the sliding ground plate 24 during axial movement of the sliding ground plate 24. Alternatively a sweeper ring could also be used maintain grounding during axial moving of the sliding ground plate 24. The ground components serve to provide an electrical ground between the two pieces of conduit 12 and 14 (shown in FIG. 1), and are preferably made from malleable iron.

Figure 4:
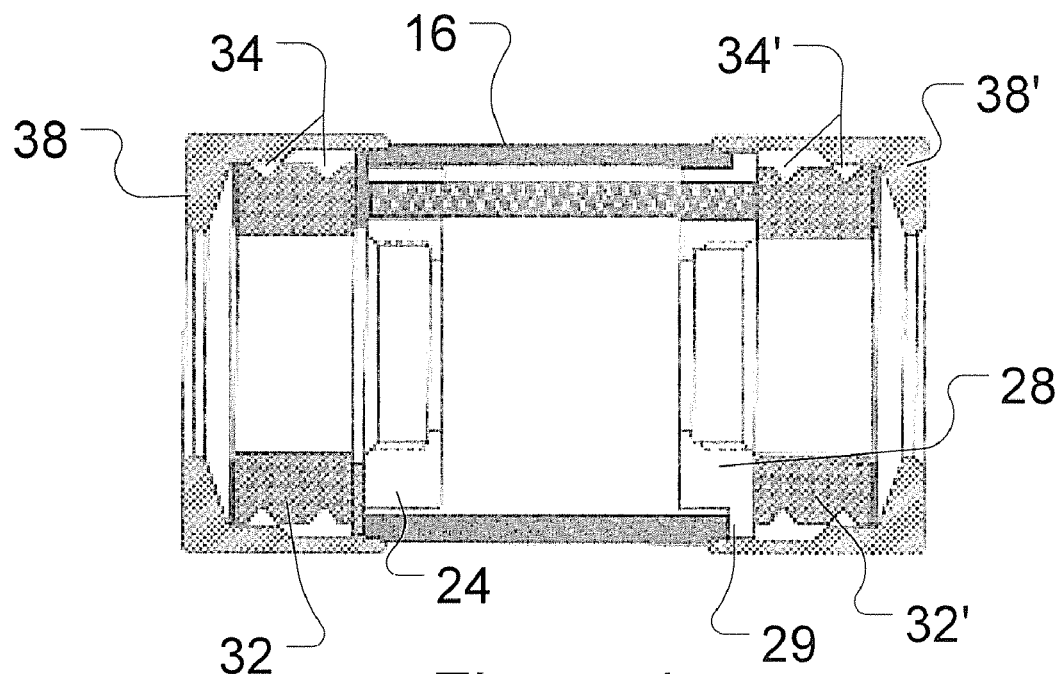
FIG. 4 is a cross-sectional view of the expansion coupling shown in FIG. 1 without the end caps tightened into place.

The sliding ground plate 24 is axially moveable within the housing 16 and the stationary ground plate 28 is positioned generally within the second end 17' of housing 16. As shown in FIGS. 3 and 4, the stationary ground plate 28 comprises a flat surface 29 which abuts second end 17' of housing 16, or the end of an internal flat 18 (shown at first end 17 of housing 16 in FIG. 5) to prevent axial movement of the stationary ground plate 28 within the housing 16. Alternatively, the stationary ground plate could abut other immovable components within the second end 17' of housing 16 such as the end of rod 56 shown in FIG. 6.

The expansion coupling 10 may further include a sealing gland positioned at the first end 17 of the housing 16. The expansion coupling may include a first sealing gland 32 with a first backup washer 30 positioned between the first sealing gland 32 and the sliding ground plate 24 and a first friction washer 36 positioned between the first sealing gland 32 and a first end cap 38. The opposite end of the housing 16 may include another sealing gland positioned at the second end 17' of the housing 16. Thus, the expansion coupling may include a second sealing gland 32' with a second friction washer 36' positioned between the second sealing gland 32' and second end cap 38'. Preferably, the first backup washer 30 is comprised of commercial quality steel, and the first and second friction washers 36 and 36' are comprised of nylon.

The first and second sealing glands 32 and 32' are preferably comprised of neoprene and as shown in FIGS. 2 and 4 may include one or more circumferential troughs 34, 34' extending partially or completely around the sealing gland. Preferably, the first and second sealing glands 32 and 32' each include two complete circumferential troughs 34, 34'.

The first end cap 38 may be threadingly secured to the first end 17 of the housing 16 for ease of removal to allow access to the interior of the expansion coupling 10. The first end cap 38 may further include a plurality of flat surfaces 42 on an outer perimeter to facilitate installation and removal of the first end cap 38 by a user.

The second end cap 38' may be threadingly secured to the second end 17' of the housing 16 for ease of removal to allow access to the interior of the expansion coupling 10. The second end cap 38' may also further include a plurality of flat surfaces 42' on an outer perimeter to facilitate installation and removal of the second end cap 38' by a user.

Once assembled as shown in FIG. 1, the first conduit 12 is passed through the first end cap 38 and first sealing gland 32, and is threaded into the sliding ground plate 24. Similarly, the second conduit 14 is passed through the second end cap 38' and second sealing gland 32', and is threaded into stationary ground plate 28.

Figure 5:
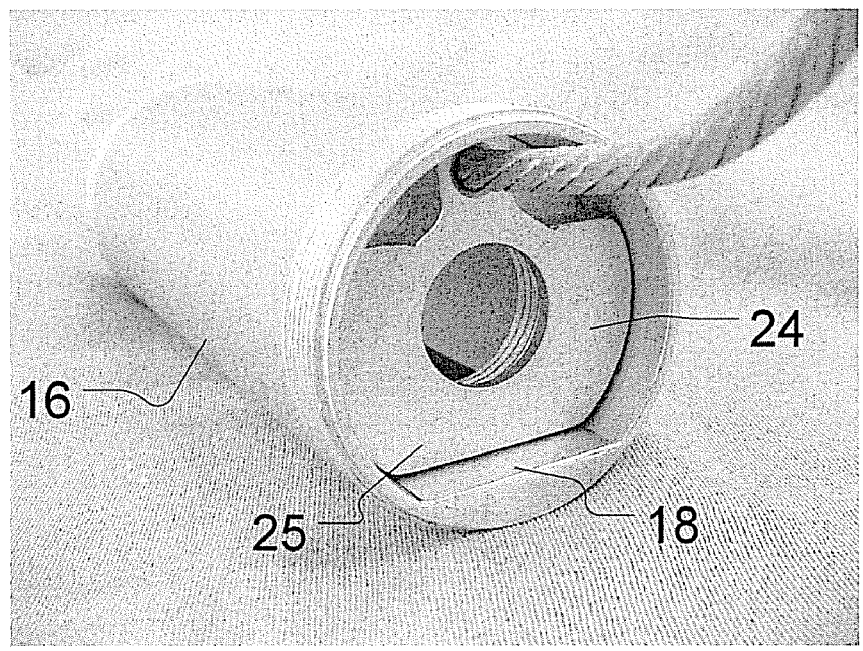
FIG. 5 is a perspective view of an anti-rotation mechanism.

The expansion coupling 10 preferably includes an anti-rotation mechanism to prevent relative rotational movement of the sliding ground plate 24 and the stationary ground plate 28 when the conduits 12 and 14 are threaded into the respective ground plates. The anti-rotation mechanism may comprise, as best shown in FIGS. 3 and 5, a first flat 25 (shown here as generally D-shaped) located on the sliding ground plate 24, a second flat 25' located on the stationary ground plate 28, and a corresponding flat 18 located within housing 16, extending downwardly and longitudinally within the housing 16. The flats 25 and 25' may be aligned with the corresponding flat 18 in order to install the ground components into the expansion coupling 10. Thus, the flats 25 and 25' correspond with flat 18 to prevent relative rotational movement when the conduits 12 and 14 and threaded into the respective ground plates 24 and 28. The flat 18 may be secured to the interior of the housing 16 by any suitable means such as welding, but is preferably cast into the housing 16.

Figure 6:
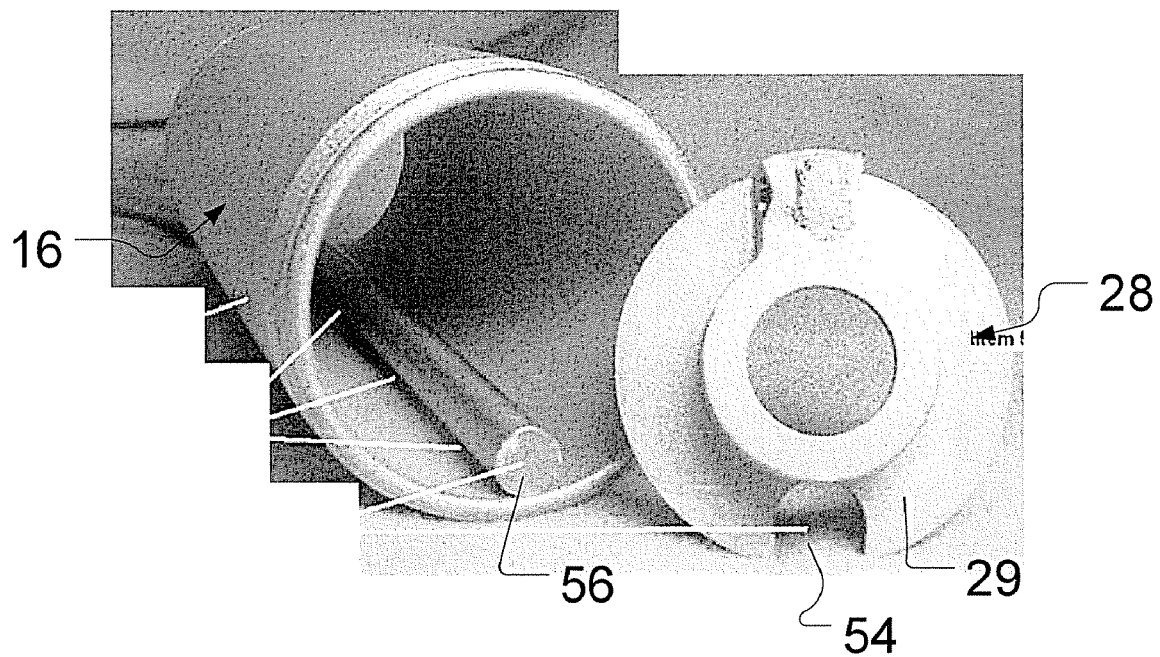
FIG. 6 is a perspective view of another alternate embodiment of an anti-rotation mechanism.

Other anti-rotation mechanisms may also be used to prevent the relative rotation of ground plates 24 and 28 during the threading of the conduits 12 and 14 into the respective ground plates 24 and 28. For example, as shown in FIG. 6, a rod 56 (shown as round) of any suitable cross-sectional geometry such as square, rectangular, octagonal, etc. may be positioned within the housing 16. In turn, the ground plates 24 and 28 may include corresponding channels 54 that are adapted to receive the rod. The rod 56 and corresponding channels 54 in the respective ground plates 24 and 28 also serve to prevent relative rotation of the ground plates during threading of the conduits 12 and 14 into the ground plates. Protrusions extending from the ground plates 24 and 28 could also be used and correspond to a longitudinal slot positioned within the housing 16.

Alternately, an aperture may be constructed in the surface of the sliding ground plate 24, and a rod may be attached to the stationary ground plate such that the rod passes through the aperture in the sliding ground plate during axial movement of the sliding ground plate 24, and serves to prevent relative rotation of the ground plates 24 and 28 during threading of the conduits 12 and 14. Any other known type of anti-rotation mechanism may also be used.

FIG. 3 shows sliding ground plate 24 with flat 25 and ground cable 26 attached to stationary ground plate 28. Sliding ground plate 24 includes internal threads 44 that are adapted to threadingly engage the threaded end of conduit 12, and stationary ground plate 28 includes internal threads 46 that are adapted to threadingly engage the threaded end of conduit 14.

Referring to FIG. 4, a cross-sectional view of an assembled, but untightened, expansion coupling 10 is shown. In FIG. 4, the second sealing gland 32' is shown positioned in the second end of housing 16, along with stationary ground plate 28 and end cap 38'. At the first end of housing 16, first sealing gland 32 is shown, along with sliding ground plate 24, and end cap 38.

As shown in FIG. 1, conduits 12 and 14 may be secured to the expansion coupling 10 on the first 17 and second 17' ends, respectively. The conduit 12 is placed through the first end cap 38 and first sealing gland 32 and is secured to the sliding ground plate 24. An external thread (not shown) on the conduit 12 is secured to an internal thread 44 on the sliding ground plate 24. Similarly, the conduit 14 is placed through the second end cap 38' and second sealing gland 32', and is secured to an internal thread 44' on the stationary ground plate 28. Alternatively, other fastening means may be used to secure the conduits 12 and 14 to the ground plates 24 and 28.

As best seen in FIGS. 1 and 4, the expansion coupling 10 may include an improved sealing gland. A lubricant (not shown) may be applied to an outer surface of the conduits 12 and 14 and/or the inner surface of the sealing glands 34 and 34'. When the conduits 12 and 14 are secured to the ground plates 24 and 28, respectively, and the end caps 38 and 38' are tightened, the two circumferential troughs 34, as well as the two circumferential troughs 34' become compressed, and thereby form inner circumferential troughs 60 and 60' on the inner surface of sealing glands 34 and 34'. Inner circumferential troughs 60 and 60' serve to trap lubricant within the troughs and provide for improved lubrication. The improved sealing gland is particularly useful with the first sealing gland 32, where there relative movement between the sealing gland 32 and the conduit 12 during thermal expansion of the conduit, and lubrication is provided during such relative movement. The formation of the inner circumferential troughs 60 and 60' on the inner surfaces of the sealing glands 34 and 34' provides for an effective seal to prevent moisture and other contaminants from entering the expansion coupling 10.

Figure 7:
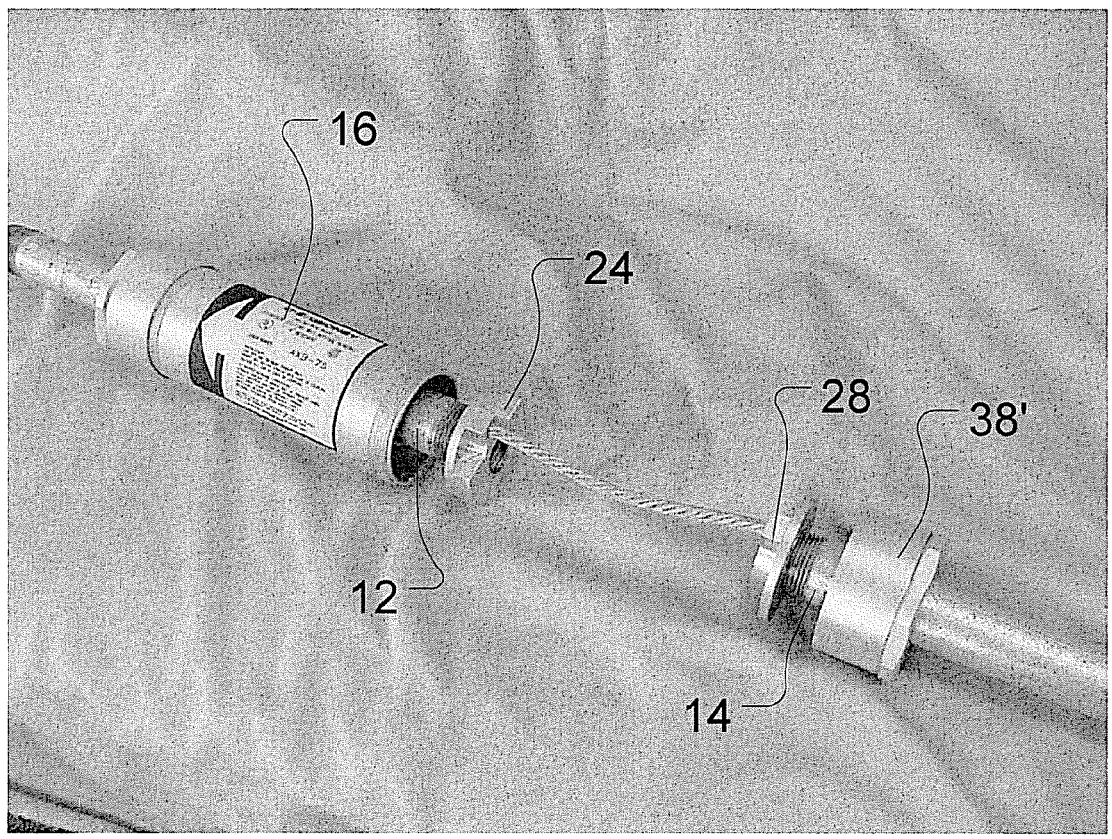
FIG. 7 is a perspective view of an expansion coupling with an end cap disassembled to show easy inspection of the ground components.

The present design provides further advantages as well. In operation, the expansion coupling 10 may be disassembled without disconnecting the conduits 12 and 14 from the respective ground plates 24 and 28. The internal components of the expansion coupling 10 may be easily inspected in the field to insure proper grounding is present. As depicted in FIG. 7, an inspector may loosen first end cap 38 to relieve the compression of the first sealing gland, and then simply loosen and separate the second end cap 38', and then simply slide the housing 16 onto the conduit 12 to expose the sliding ground plate 24, ground cable 26, and stationary ground plate 28, as well as the ends of both conduits 12 and 14, and allow a field inspector to visibly see the internal grounding present between the sliding ground plate 24 and stationary ground plate 28 connected via ground cable 26. Thus, the field inspector can verify that there is a proper electrical ground between conduit 12 and conduit 14. This is a beneficial advantage, because in some instances field inspectors have been hesitant to approve expansion couplings that are internally grounded and in some instances redundant external bonding jumpers were placed on the expansion couplings to pass inspection. Thus, the present invention allows for a very easily field-inspectable unit where a field inspector can inspect the internal grounding components of the expansion coupling simply by removing a single end cap and moving the housing 16 to reveal the internal ground componentry.

While certain features and embodiments of the present application have been described in detail herein, it is to be understood that the application encompasses all modifications and enhancements within the scope and spirit of the following claims.

I claim:

1. An electrical expansion coupling comprising:
a housing having a first end and a second end;
a first end cap secured to the first end of the housing with a first sealing gland positioned therein;
a second end cap secured to the second end of the housing with a second sealing gland positioned therein;
an axial sliding ground plate adapted to receive a first electrical conduit positioned within the first end of the housing;
a stationary ground plate being adapted to receive a second electrical conduit positioned within the second end of the housing;
a grounding member electrically connecting the axial sliding ground plate and the stationary ground plate; and
an anti-rotation mechanism adapted for preventing relative rotation of the sliding ground plate and the stationary ground plate when a conduit is threaded into the sliding ground plate or the stationary ground plate.

2. The electrical expansion coupling of claim 1, wherein the first sealing gland includes two or more circumferential troughs on an outer diameter of the first sealing gland.

3. The electrical expansion coupling of claim 1, wherein a trough is formed on an inner diameter of the first sealing gland when the first end cap is tightened onto the first end of the housing.

4. The electrical expansion coupling of claim 2 wherein a trough is formed on an inner diameter of the first sealing gland when the first sealing gland is compressed by the first end cap.

5. The electrical expansion coupling of claim 1 wherein the anti-rotation mechanism comprises a flat provided on the sliding ground plate adapted to engage a corresponding flat positioned within the housing.

6. The electrical expansion coupling of claim 1 wherein the stationary ground plate includes a surface that abuts the anti-rotation mechanism thereby preventing axial movement of the stationary ground plate within the housing.

7. The electrical expansion coupling of claim 1 further including a coupler attached to each end of the housing.

8. The electrical expansion coupling of claim 1 wherein the anti-rotation mechanism comprises a rod positioned inside of the housing and a corresponding channel adapted to receive the rod, positioned on the sliding ground plate.

9. The electrical expansion coupling of claim 8 wherein the rod has a square cross-section.

10. The electrical expansion coupling of claim 1 wherein the grounding member is an electrical cable.

11. The electrical expansion coupling of claim 1, wherein the second end cap is removable to allow the housing to be moved over the first conduit to expose the axial sliding ground plate, grounding member, and stationary ground plate, without removing either the first or second conduits from the ground plates to facilitate field inspection of the ground plates and grounding member.

12. The electrical expansion coupling of claim 11, where such field inspection can be performed with only the separation of the second end cap.

13. An electrical expansion coupling comprising:
a housing having a first end and a second end;
a first end cap secured to the first end of the housing with a first sealing gland positioned therein;
an axial sliding ground plate adapted to receive a first electrical conduit positioned within the first end of the housing;
a stationary ground plate being adapted to receive a second electrical conduit positioned within the second end of the housing;
a grounding member electrically connecting the axial sliding ground plate and the stationary ground plate;
wherein the first sealing gland includes two or more circumferential troughs on an outer diameter of the first sealing gland and a trough is formed on an inner diameter of the first sealing gland when the first sealing gland is compressed by the first end cap.

14. The expansion fitting of claim 13, further including a second sealing gland positioned within a second end cap disposed at the second end of the housing, two or more circumferential troughs on an outer diameter of the second sealing gland and a trough formed on an inner diameter of the second sealing gland when the second sealing gland is compressed by the second end cap.

15. An electrical expansion coupling comprising:
a housing having a first end and a second end;
a first end cap secured to the first end of the housing;
a second end cap secured to the second end of the housing;
an axial sliding ground plate adapted to receive a first electrical conduit positioned within the first end of the housing;
a stationary ground plate being adapted to receive a second electrical conduit positioned within the second end of the housing;
a grounding member electrically connecting the axial sliding ground plate and the stationary ground plate; and
an anti-rotation mechanism adapted for preventing relative rotation of the sliding ground plate and the stationary ground plate when a conduit is threaded into the sliding ground plate or the stationary ground plate;
wherein the second end cap is separable to allow the housing to be moved over the first conduit to expose the axial sliding ground plate, grounding member, and stationary ground plate, without removing either the first or second conduits from the ground plates to facilitate field inspection of the ground plates and grounding member.

16. The electrical expansion coupling of claim 15, where such field inspection can be performed with only the separation of the second end cap.

* * * * *